US005754669A

United States Patent [19]

Shiota et al.

[11] Patent Number: 5,754,669

[45] Date of Patent: May 19, 1998

[54] SPEAKER GRILLE

[75] Inventors: Tomio Shiota, Takatsuki; Naohiro Shikata, Toyono-gun; Kaoru Shimizu, Osaka, all of Japan

[73] Assignee: Matsushita Electric Industrial Co., Ltd., Japan

[21] Appl. No.: 694,424

[22] Filed: Aug. 12, 1996

[30] Foreign Application Priority Data

| | | | |
|---|---|---|---|
| Nov. 29, 1995 | [JP] | Japan | 7-310481 |
| Feb. 19, 1996 | [JP] | Japan | 8-030282 |

[51] Int. Cl.[6] .......... H04B 25/00

[52] U.S. Cl. .......... 381/205; 381/189; 381/87

[58] Field of Search .......... 381/205, 188, 381/87, 88, 189; 181/150, 175

[56] References Cited

U.S. PATENT DOCUMENTS

| | | | |
|---|---|---|---|
| 3,989,909 | 11/1976 | Hodsdon et al. | 381/205 |
| 4,919,227 | 4/1990 | Chicoine | 181/175 |

*Primary Examiner*—Sinh Tran

*Attorney, Agent, or Firm*—Parkhurst & Wendel, L.L.P.

[57] ABSTRACT

A plurality of dummy bores with bottoms (21) are disposed in the vicinity of through holes (11) defining speaker sound emanating apertures. Each dummy bore (21) has a bottom shaped like a cone or pyramid (23) such that outer light rays (31) becoming incident through the dummy bores (21) are irregularly reflected from the bottom to emerge therefrom as decreased in intensity. With the above arrangement, the through holes (11) and dummy bores (21) may appear less differently from each other. Thus provided is a speaker grille of excellent design.

5 Claims, 4 Drawing Sheets

(G)

(H)

(I)

SPEAKER GRILLE

BACKGROUND OF THE INVENTION

1. Field of the Invention

The present invention relates to a speaker grille for use in cabinets constituting display units of television receivers, desktop personal computers and the like, or constituting audio systems.

2. Prior Art

Speaker grilles are designed to protect speaker diaphragms. Additionally, an importance is attached to the design of the grilles.

Prior art speaker grilles generally include a plurality of through holes in the surface thereof which define sound emanating apertures for releasing air in front of the speaker out of the apparatus (out of the cabinet) and around a plurality of dummy bores, or impenetrable holes, that are formed around these through holes, as disclosed in U.S. Pat. No. 4,919,227, for example. The dummy bores are provided in the light of the design of the apparatus and have flat surface at the bottom thereof. The aforementioned through holes normally have a small inner diameter, such as 3 mm or less in consideration of the design and protection of the speaker.

The speaker grilles used in the cabinets of the television receivers or the like are generally formed from a resin material.

The aforesaid through holes and dummy bores are required to have an appearance indistinguishable from each other such that the grille may feature good design with the integrity of appearance. Unfortunately, with the conventional arrangement of the speaker grilles, the difference in appearance between the through holes and dummy bores is relatively obvious, allowing the holes to be distinguished from the bores. The following fact is responsible for such obvious difference.

That is, when outer light rays are admitted to the through holes from the front side of the speaker grille (as seen from a listener), the outer rays penetrate the through holes, making the through holes appear dark. In contrast, the outer rays incident on the dummy holes are reflected from the flat bottom surface at the point end thereof so that the listener may recognize the color tone of the speaker grille itself.

To reduce reflection of the outer rays becoming incident on the dummy bores, a depth of the impenetrable bores may be increased. An increased depth of the dummy bores means an increased depth of the through holes. Accordingly, when through holes of a small diameter and greater depth are formed in a resin material, a mold for forming the grille must have thin long pins which have lower strength and are more liable to break. Additionally, the resin material shrinks to capture the pins during the process of molding, resulting in poor releasability from the pins. This forms the cause of defective molding. Hence, an increase in the length of the mold pins is not practically feasible.

DISCLOSURE OF THE INVENTION

In view of the foregoing, it is an object of the invention to provide a speaker grille wherein the through holes (sound emanating apertures) and dummy bores (impenetrable holes with bottoms) are indistinguishable from each other in appearance and whereby difficulties in the process of resin molding may be eliminated.

For achieving the above objects, the present invention is characterized in that the bottom of the dummy bores at the point end thereof has any one of the forms including concave, convex and combination of concave and convex, instead of a flat surface, such that the light rays are irregularly reflected from the bottom surface.

With this arrangement, the outer rays admitted to the dummy bores are irregularly reflected from the bottom surface thereof to be dispersed and reduced in intensity when emerging therefrom. Accordingly, the dummy bores appear dark, similar in appearance to the through holes. This makes it difficult to distinguish the through holes from the dummy bores by appearance, whereby the speaker grille of good design is provided. This arrangement also allows the through holes to have a small depth so as to eliminate the need for the use of thin long mold pins. Thus, a stable molding process of short cycle is realized. Needless to say, freedom of design is increased.

DESCRIPTION OF THE PREFERRED EMBODIMENTS

Figure 1:
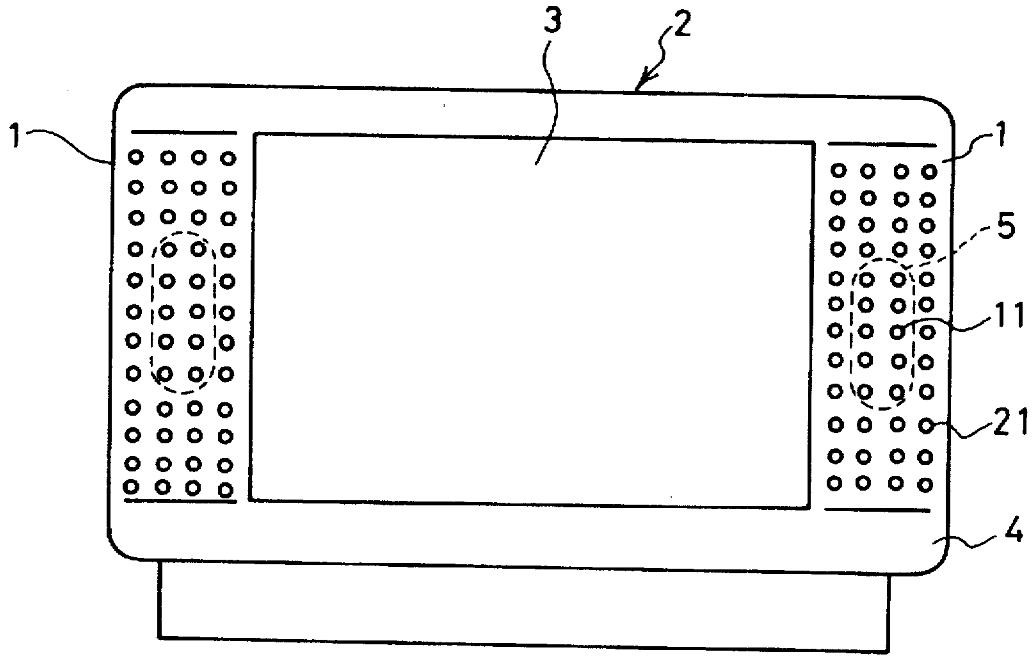
FIG. 1 is a front view of a television receiver employing a speaker grille according to an embodiment of the invention.
Figure 2:
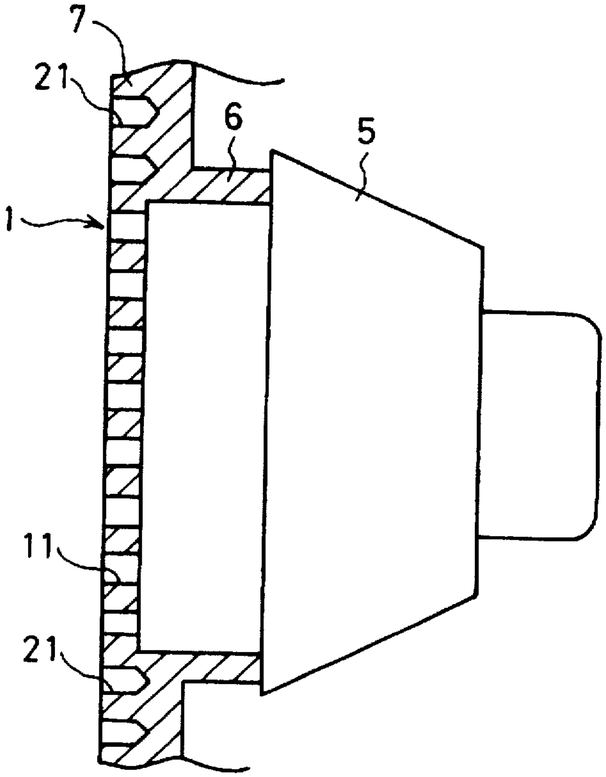
FIG. 2 is a sectional view of a principal portion of the above speaker grille.
Figure 3:
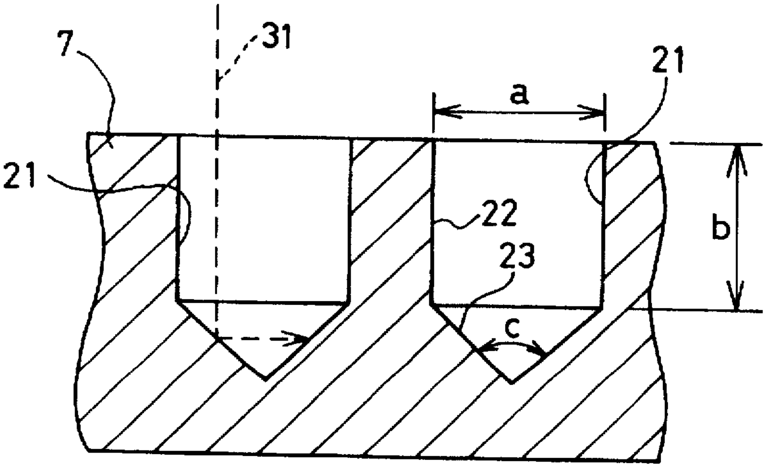
FIG. 3 is a sectional view of dummy bores in the above speaker grille.

Referring now to FIGS. 1 through 3, an embodiment of the invention will be described hereinbelow.

In FIG. 1, reference character 1 denotes a pair of speaker grilles which are disposed at opposite sides of the face of a cathode-ray tube 3 of a television receiver 2. The speaker grilles 1 constitute a portion of a cabinet 4 of the television receiver 2.

Each speaker grille 1 comprises a cylinder member 6 for guiding air in front of a speaker 5 and a panel 7 disposed at the front side of the cylinder member 6. The panel 7 is formed with a plurality of through holes 11 defining speaker sound emanating apertures for releasing air from the cabinet 4, the air being guided from the front side of the speaker 5 by the cylinder member 6, and a plurality of dummy bores 21 with bottoms which are disposed around the through holes 11. The speaker grilles 1 are formed from a resin material.

The dummy bores 21, as shown in FIGS. 2 and 3, each have a cylindrical interior wall 22 and a conical bottom surface 23 (conical concave) at the point end thereof. The impenetrable dummy bore 21 has a hole diameter 'a' of 3 mm or less, a depth 'b' of 0.5 mm or more, and a conical apex angle 'c' of 150° or more.

Description will now be given on the behavior of the outer rays (straight light rays) becoming incident straight on the dummy bore 21 parallel to the interior wall 22 thereof.

Outer rays 31 becoming incident straight on the dummy bore 21 (impenetrable hole) impinge against the conical surface 23 at the point end thereof to be reflected at angles determined by a conical apex angle 'c', and then to be irregularly reflected from the depthwise interior wall 22 of the dummy bore 21. As a result, reflected light rays finally emerging from the dummy bore 21 are dispersed to be decreased in intensity. Consequently, the dummy bores 21 appear dark in the depth thereof, thus providing a similar appearance to the through holes 11.

As described above, it is possible without using mold pins of a greater length that even a dummy bore having a small hole diameter of 3 mm or less be made to differ less from the through hole 11. Thus, there can be attained a speaker grille 1 of excellent design. Additionally, the through holes 11 may have a smaller depth to eliminate the need for use of thin long mold pins so that the speaker grilles may be molded in a stable process of a short cycle. Needless to say, the freedom of design is also increased.

Incidentally, in the case of a greater hole diameter 'a', the mold pins have a greater diameter which allows for increase in the depth 'b'. If the apex angle 'c' is greater than 150°, the conical surface approximates to a flat plane so that the light rays irregularly reflected therefrom are decreased.

Figure 4A:
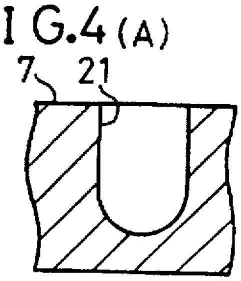
FIGS. 4(A)–(I) shows sectional views of dummy bores of other embodiments hereof.
Figure 4B:
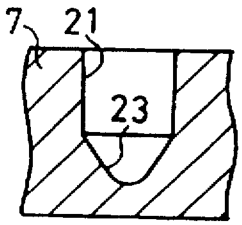
Figure 4C:
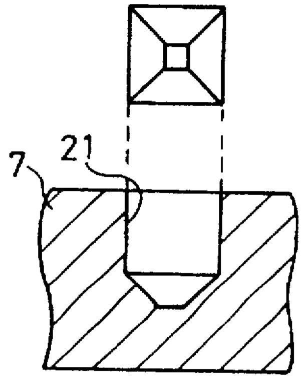
Figure 4D:
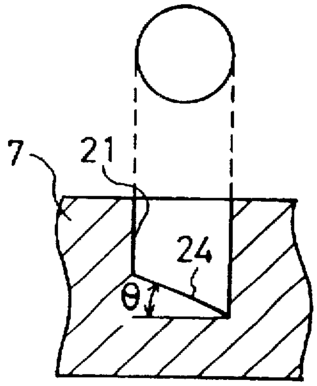
Figure 4E:
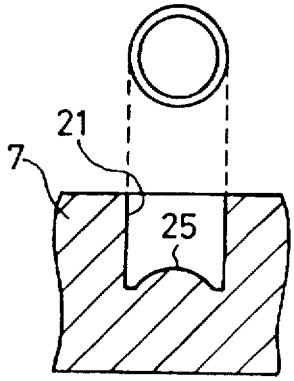
Figure 4F:
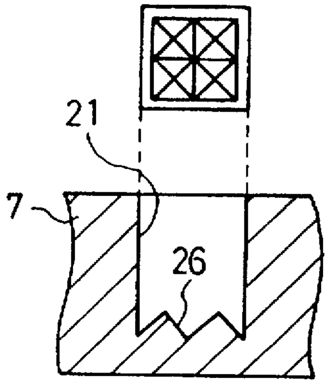
Figure 4:
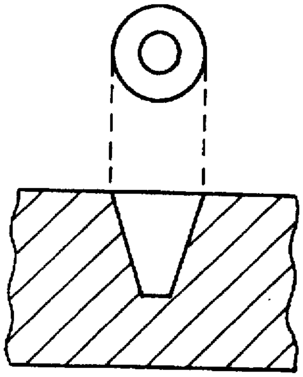
Figure 4:
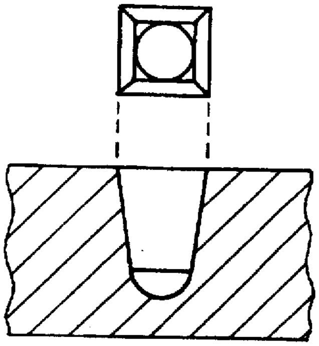
Figure 4:
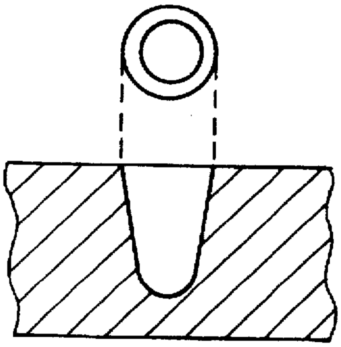

Other modes of the dummy bore 21 are shown in FIG. 4. The bottom surface of the dummy bore 21 may be in the form of a semispherical concave surface as shown in FIG. 4(A), a concave surface combining a conical surface 23 and a semisphere as shown in FIG. 4(B), a concave surface of a truncated pyramid as shown in FIG. 4(C), a slanted plane 24 having a tilt angle 'θ' of 15° or more as shown in FIG. 4(D), a spherical convex surface 25 as shown in FIG. 4(E), a concavo-convex surface 26 in a form of a matrix of pyramid-like projections as shown in FIG. 4(F), a truncated cone as shown in FIG. 4(G), a combination of a truncated pyramid and a semisphere shown in FIG. 4(H), and a combination of a truncated cone and a semisphere shown in FIG. 4(I).

Similarly to the aforementioned embodiment, these dummy bores 21 also accomplish decreased difference in appearance from the through holes 11, and thus are realized speaker sound emanating apertures of excellent design.

It is obvious to those skilled in the art that the bottom of the dummy bores 21 may be in any form that causes straight incident rays to be reflected irregularly, such as concave, convex, combination of concave and convex, slanted plane or the like. Similarly, the dummy bore may be practiced in any form as seen from the top, which includes, additionally to circle, polygons including triangle, rectangular and the like; ellipse; oblong circle and the like.

While a preferred embodiment has been described, variations thereto will occur to those skilled in the art within the scope of the present inventive concepts which are defined by the following claims.

What is claimed is:

1. A speaker grille comprising through holes defining speaker sound emanating apertures and a plurality of dummy bores, each having a bottom, disposed in the vicinity of the through holes, the bottoms of said dummy bores having any one of the forms including concave, convex, and combination of concave and convex contours, a cross section of said dummy bores forming one of a circle having a diameter of not greater than 3 mm and a polygon having a side of not greater than 3 mm, the dummy bores having a depth of not less than 0.5 mm.

2. A speaker grille comprising through holes defining speaker sound emanating apertures and a plurality of dummy bores, each having a bottom, disposed in the vicinity of the through holes, the bottoms of said dummy bores defining at least one of a cone, a pyramid, a truncated cone, a truncated pyramid, a semisphere, a combination of a truncated cone and semisphere, and a combination of a truncated pyramid and a semisphere.

3. A speaker grille as set forth in claim 2, wherein the dummy bores have a cross-section forming one of a circle having a diameter of not greater than 3 mm and a polygon having a side of not greater than 3 mm, the dummy bores having a depth of not less than 0.5 mm.

4. A speaker grille as set forth in claim 2, wherein the bottoms of the dummy bores form a cone or pyramid having an apex angle of not greater than 150°.

5. A speaker grille comprising through holes defining speaker sound emanating apertures and a plurality of dummy bores, each having a bottom, disposed in the vicinity of the through holes, the bottom of said dummy bores defining respective slanted planes, said dummy bores having a cross-section forming one of a circle having a diameter of not greater than 3 mm and a polygon having a side not greater than 3 mm, the dummy bores having a depth of not less than 0.5 mm.

* * * * *

US005754669C1

(12) REEXAMINATION CERTIFICATE (4366th)

United States Patent

Shiota et al.

(10) Number: US 5,754,669 C1

(45) Certificate Issued: May 22, 2001

(54) SPEAKER GRILLE

(75) Inventors: Tomio Shiota, Takatsuki; Naohiro Shikata, Toyono-gun; Kaoru Shimizu, Osaka, all of (JP)

(73) Assignee: Matsushita Electric Industrial Co., Ltd., Kadoma (JP)

Reexamination Request:
No. 90/005,409, Jul. 14, 1999

Reexamination Certificate for:

| | |
|---|---|
| Patent No.: | **5,754,669** |
| Issued: | **May 19, 1998** |
| Appl. No.: | **08/694,424** |
| Filed: | **Aug. 12, 1996** |

(30) Foreign Application Priority Data

Nov. 29, 1995 (JP) .................................................. 7-310481
Feb. 19, 1996 (JP) .................................................. 8-030282

(51) Int. Cl.$^{7}$ .................................................. H04R 25/00

(52) U.S. Cl. ............................ 381/386; 381/189; 381/87; 381/391

(58) Field of Search .................................... 381/349, 341, 381/347, 386, 387, 388, 391, 395, 189; 181/150, 152, 155, 159, 191, 192, 199, 175, 194, 195

(56) References Cited

U.S. PATENT DOCUMENTS 3,328,869 7/1967 Lannert ................................. 29/160
3,909,530 * 9/1975 Gosswiller ........................... 381/156

FOREIGN PATENT DOCUMENTS 34 31 005 A1 3/1986 (DE) .
40 36 334 A1 5/1992 (DE) .
WO 94/12002 5/1994 (WO) .

* cited by examiner

*Primary Examiner*—Huyen D. Le

(57) ABSTRACT

A plurality of dummy bores with bottoms (21) are disposed in the vicinity of through holes (11) defining speaker sound emanating apertures. Each dummy bore (21) has a bottom shaped like a cone or pyramid (23) such that outer light rays (31) become incident through the dummy bores (21) are irregularly reflected from the bottom to emerge therefrom as decreased in intensity. With the above arrangement, the through holes (11) and dummy bores (21) may appear less differently from each other. Thus provided is a speaker grille of excellent design.

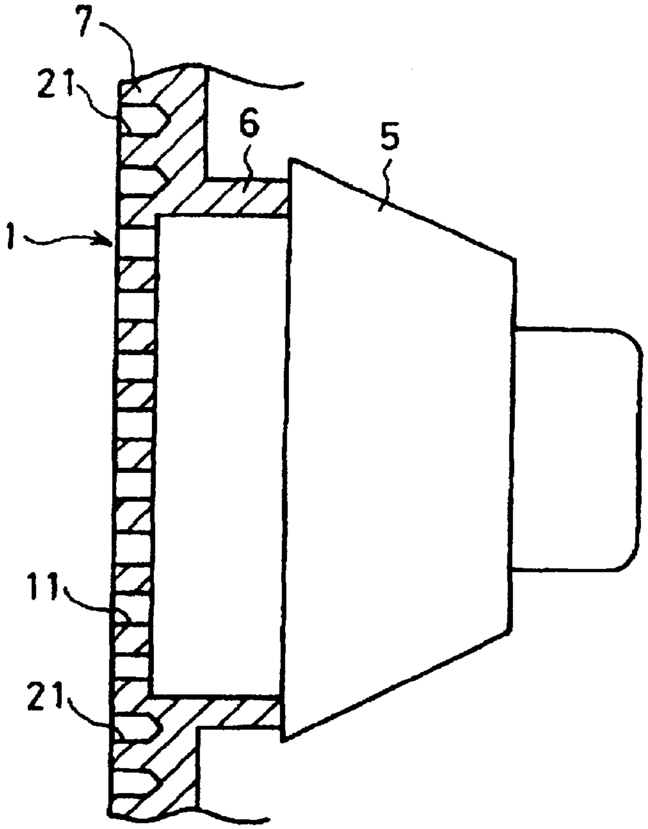

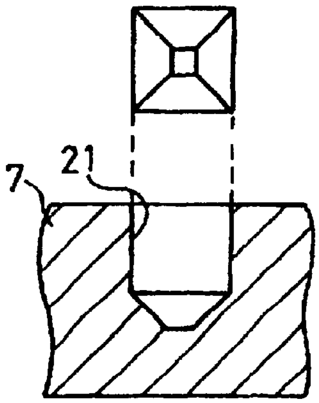

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 5 are determined to be patentable as amended.

Claims 3 and 4, dependent on an amended claim, are determined to be patentable.

1. A speaker grille comprising through holes defining speaker sound emanating apertures and a plurality of dummy bores, each *dummy bore* having *a top, sides, and* a bottom, disposed in the vicinity of the through holes, the bottoms of said dummy bores having any one of the forms including concave, convex, and combination of concave and convex contours, a cross section of *the top of* said dummy bores forming one of a circle having a diameter of not greater than 3 mm and a [polygon] *square* having a side of not greater than 3 mm, the dummy bores having a depth of not less than 0.5 mm*, with the provisos that* (*1*) *when the top of the dummy bore is a circle, the sides of the dummy bore are perpendicular or tilted relative to a surface of the speaker grille in which the top is located and* (*2*) *when the top of the dummy bore is a square, the sides of the dummy bore are perpendicular to a surface of the speaker grille in which the top is located.*

2. A speaker grille comprising through holes defining speaker sound emanating apertures and a plurality of dummy bores, each *dummy bore* having *a top, sides, and* a bottom, disposed in the vicinity of the through holes, *a cross section of the top of said dummy bores forming a circle or a square,* the bottoms of said dummy bores defining at least one of a cone, a pyramid, a truncated cone, a truncated pyramid, a semisphere, a combination of a truncated cone and semisphere, and a combination of a truncated pyramid and a semisphere*, with the provisos that* (*1*) *when the top of the dummy bore is a circle, the sides of the dummy bore are perpendicular or tilted relative to a surface of the speaker grille in which the top is located and* (*2*) *when the top of the dummy bore is a square, the sides of the dummy bore are perpendicular to a surface of the speaker grille in which the top is located.*

5. A speaker grille comprising through holes defining speaker sound emanating apertures and a plurality of dummy bores, each *dummy bore* having *a top, sides, and* a bottom, disposed in the vicinity of the through holes, the bottom of said dummy bores defining respective slanted planes, said dummy bores having a cross-section forming one of a circle having a diameter of not greater than 3 mm and a [polygon] *square* having a side not greater than 3 mm, the dummy bores having a depth of not less than 0.5 mm*, with the provisos that* (*1*) *when the top of the dummy bore is a circle, the sides of the dummy bore are perpendicular or tilted relative to a surface of the speaker grille in which the top is located and* (*2*) *when the top of the dummy bore is a square, the sides of the dummy bore are perpendicular to a surface of the speaker grille in which the top is located.*

* * * * *